(No Model.)

J. W. ROBERTS.
COMBINED COTTON CULTIVATOR AND CHOPPER.

No. 303,050. Patented Aug. 5, 1884.

WITNESSES:
Chas. Nida
C. Sedgwick

INVENTOR:
J. W. Roberts
BY Munn & Co.
ATTORNEYS.

UNITED STATES PATENT OFFICE.

JAMES WILLIAM ROBERTS, OF MOODY, MISSOURI.

COMBINED COTTON CULTIVATOR AND CHOPPER.

SPECIFICATION forming part of Letters Patent No. 303,050, dated August 5, 1884.

Application filed November 1, 1883. (No model.)

*To all whom it may concern:*

Be it known that I, JAMES WILLIAM ROBERTS, of Moody, in the county of Howell and State of Missouri, have invented a new and useful Improvement in Combined Cotton Cultivators and Choppers, of which the following is a full, clear, and exact description.

Reference is to be had to the accompanying drawings, forming a part of this specification, in which similar letters of reference indicate corresponding parts in all the figures.

Figure 1:
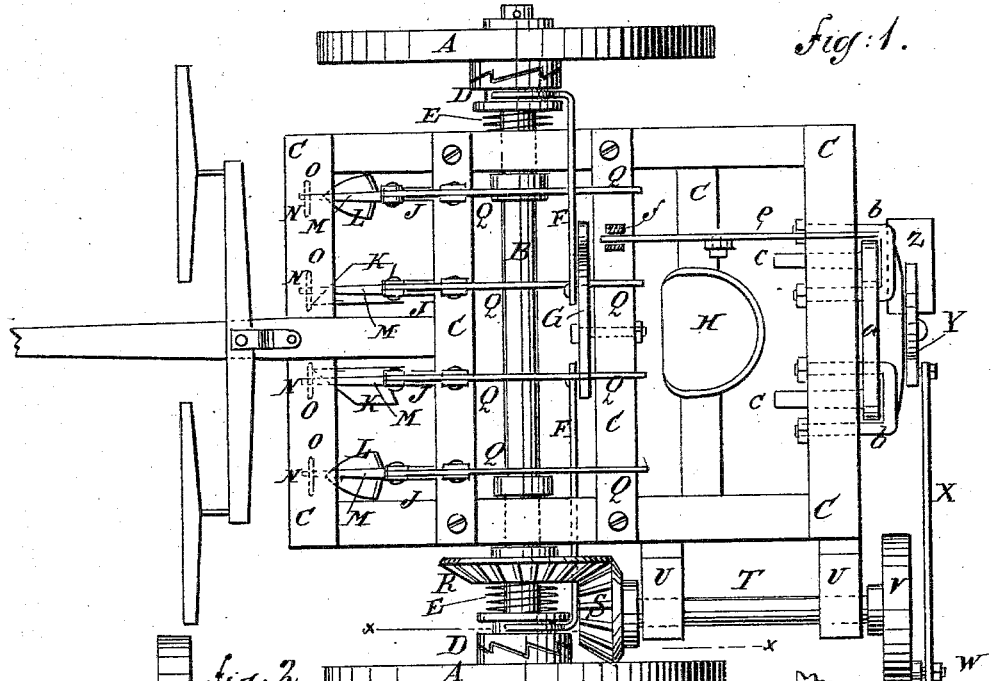
Figure 2:
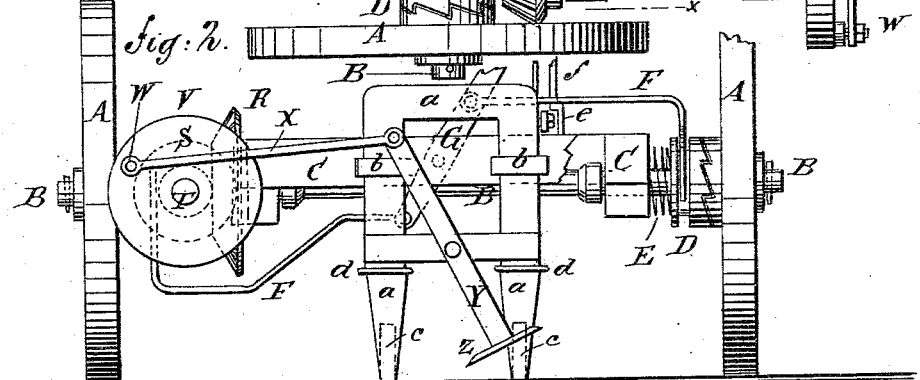
Figure 3:
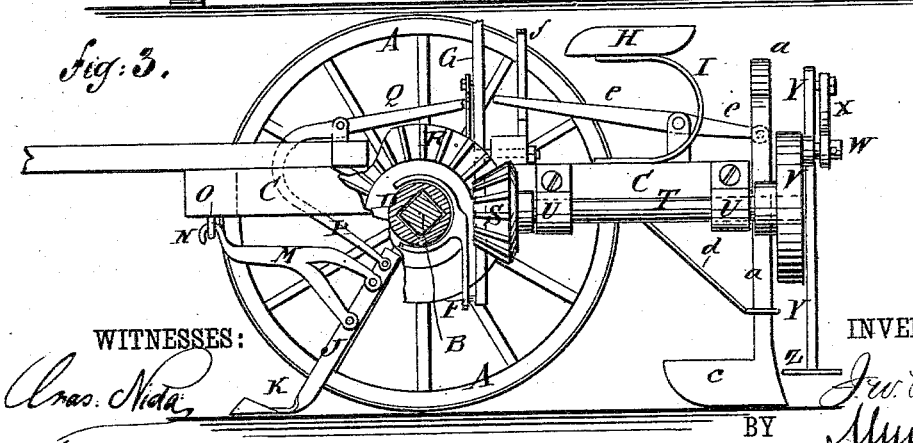

Figure 1 is a plan view of my improvement. Fig. 2 is a rear elevation of the same, part being broken away. Fig. 3 is a sectional side elevation of the same, taken through the line *x x*, Fig. 1, part being broken away.

The object of this invention is to facilitate the cultivation of cotton, and also to promote convenience in controlling the machine, by means of which the said cultivation is effected.

The invention consists in a combined cotton cultivator and chopper constructed with a frame mounted upon wheels and an axle, and provided with standards and beams connected with the frame by hooks and staples, and by levers for scraping and plowing the plants. A pivoted lever carrying a chopping-hoe is connected with the axle of the carriage by a connecting-rod, a crank, a shaft, and gear-wheels, so that the chopper will be operated to chop the plants to a stand by the revolution of the said axle. The hoe-carrying lever is pivoted to a vertically-sliding frame provided with runners to slide upon the ground and limit the depth to which the hoe enters the soil. The vertical frame and its attachments are raised from the ground by a lever pivoted to the carriage-frame and provided with a catch-bar for supporting the chopper when raised. The drive-wheels are connected with the axle by spring-pressed clutches, operated by forked connecting-rods and a lever, so that the axle, and consequently the chopper, can be readily thrown out of gear with the drive-wheels, as will be hereinafter fully described.

A are the drive-wheels, the axle B of which revolves in bearings attached to the frame C.

Upon the inner ends of the hubs of the wheels A are formed clutch-teeth, with which engage the teeth of the clutches D, which slide upon the axle B, and which are held in gear with the said hubs by spiral springs E, also placed upon the said axle B. In the clutches D are formed annular grooves to receive the forked outer ends of the connecting-rods F, which are bent inward, and are pivoted at their inner ends to the lever G upon the opposite sides of and equally distant from the pivoting-point of the said lever. The lever G is pivoted to a cross-bar of the frame C in such a position that its upper end can be readily reached and operated by the driver from his seat H, the standard I of which is attached to a cross-bar of the frame C. J are the plow-standards, to the lower ends of which are attached scrapers K or plows L, as the work to be done may require.

To the standards J are attached the rear ends of the beams M, which have hooks N formed upon their forward ends, to hook into staples O or eyebolts attached to a cross-bar of the frame C.

To the upper ends of the standards J are pivoted the lower ends, P, of the levers Q, which lower ends are curved downwardly and rearwardly. The levers Q are pivoted to supports attached to the frame C, and their rear ends extend back into such a position that they can be readily reached and operated by the driver with his feet to raise and lower the plow-standards, to cause the plows to work deeper or shallower in the ground, and to raise them from the ground and to move the said standards laterally to guide the plows. The rear ends of the levers Q, or a cross-bar connected with the said levers, can be provided with foot-rests for the convenience of the driver in operating the said levers.

To the axle B, at a side of the frame C, is attached a large beveled gear-wheel, R, the teeth of which mesh into the teeth of the smaller gear-wheel S, attached to the forward end of the shaft T. The shaft T revolves in bearings U, attached to the side bar of the frame C, and to the rear end of the said shaft is attached a crank or crank-wheel, V, to the crank-pin W of which is pivoted the outer end of the connecting-rod X. The inner end of the connecting-rod X is pivoted to the upper end of the lever Y, to the lower end of which is attached the chopping-hoe Z. The chopping-hoe Z is made with a cutting-edge upon each side, as shown in Fig. 2, so that it will do its work when moving in either direction. The hoe Z is made of a length equal to the required distance apart of the hills to be left for a stand. The lever Y is pivoted at its middle part to the lower cross-bar of the frame $a$, which slides up and down in keepers $b$, or other suitable guides attached to the rear cross-bar of the frame C. To the lower ends of the side bars of the frame $a$ are attached, or upon them are formed, runners $c$, which slide upon the soil at the opposite sides of the rows of plants, and serve as a gage to limit the depth to which the chopper Z enters the soil. The draft-strain upon the lower end of the frame $a$ is sustained by the braces $d$, the forward ends of which are attached to the frame C, and their rear ends have eyes formed in them to receive the lower parts of the side bars of the frame $a$, so that the free up-and-down movement of the said frame will not be prevented.

To the upper part of the frame $a$ is pivoted the rear end of the lever $e$, which is pivoted to a support attached to the frame C, and its forward end projects into such a position that it can be readily reached and operated by the driver from his seat, to raise the frame $a$ and the chopper from and lower them to the ground. The forward part of the lever $e$ moves up and down along a guide-upright, $f$, which is attached to the frame C, and has a recess or shoulder formed upon it in such a position as to receive the lever $e$ when holding the frame $a$ and the chopper when raised from the ground, and thus support the said frame and chopper.

The drive-wheels A and the gear-wheels R S are so regulated in size that the advance of the machine between the successive strokes of the chopping-hoe Z will leave hills of the size desired for a stand. With this construction a row of plants can be scraped, plowed, and chopped at one passage of the machine along the said row; or the chopper can be held from operating and the plants scraped and plowed; or the scrapers can be replaced by plows, and the plants simply plowed by the passage of the machine along the row.

I do not abandon or dedicate to the public any patentable features set forth herein, and not hereinafter claimed, but reserve the right to claim the same either in a reissue of any patent that may be granted upon this application, or in other applications for Letters Patent that I may make.

Having thus described my invention, I claim as new and desire to secure by Letters Patent—

1. In a cotton cultivator and chopper, the combination, with the frame C, of the standards J, the beams M, extending upwardly in front of said standards, and having hooks N, for engaging the staples O on the frame C, and the pivoted levers Q, pivoted near their middle, the lower ends extending downwardly and rearwardly, and pivoted to the top of standards J, and their upper rearward arms extending near the seat of the driver, substantially as herein shown and described, whereby the said beams and standards can be readily adjusted and guided, as set forth.

2. In a cotton cultivator and chopper, the combination, with the drive-wheels A, the axle B, and the frame C, of the gear-wheels R S, the shaft T, the crank V, the connecting-rod X, the lever Y, pivoted to vertically-sliding adjustable frame, and the chopping-hoe Z, substantially as herein shown and described, whereby the plants will be chopped to a stand by the passage of the machine along a row of plants, or the said levers and chopping-hoes be suspended, as set forth.

3. In a cotton cultivator and chopper, the combination, with the frame C and the lever Y, carrying the chopping-hoe Z, of the sliding frame $a$, having runners $c$, the guides $b$, and the braces $d$, substantially as herein shown and described, whereby the chopper will adjust itself to the surface of the ground, as set forth.

4. In a cotton cultivator and chopper, the combination, with the vertically-sliding frame $a$, having pivoted thereon the reciprocating lever Y and the chopping-hoe Z, of the lever $e$, pivotally connected to the frame $a$ and the main frame C, and the catch-bar $f$, substantially as herein shown and described, whereby the chopper can be readily raised from and lowered to the ground, as set forth.

JAMES WILLIAM ROBERTS.

Witnesses:
ENOS C. MCKELVY,
D. T. BROWN.